United States Patent Office 2,745,283
Patented May 15, 1956

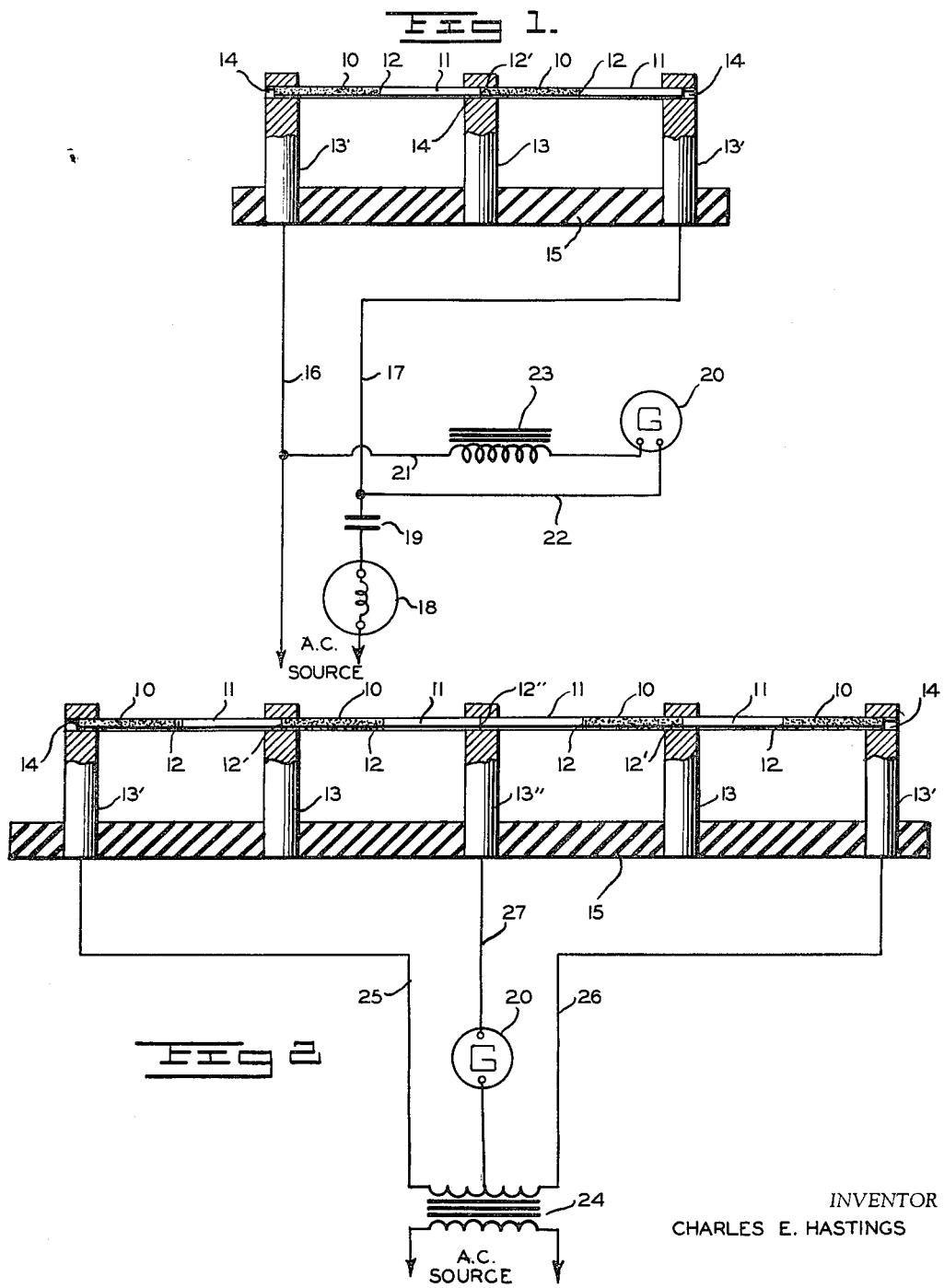

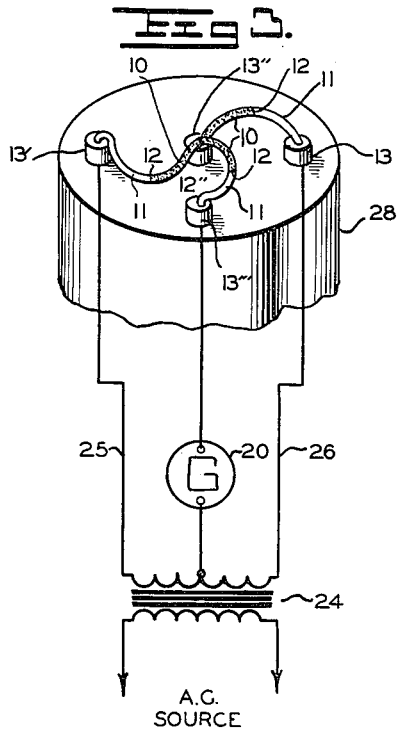
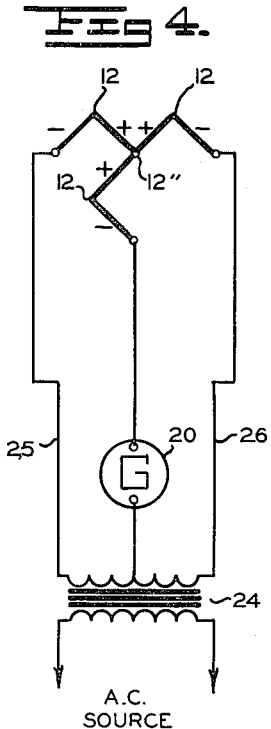
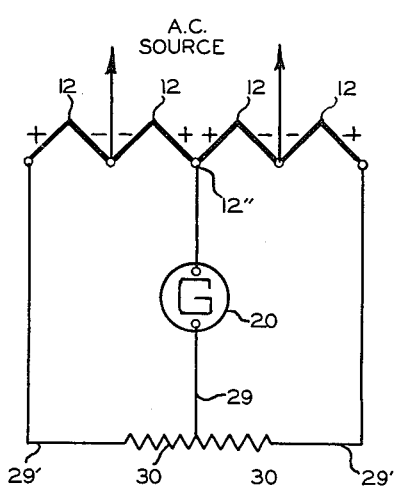
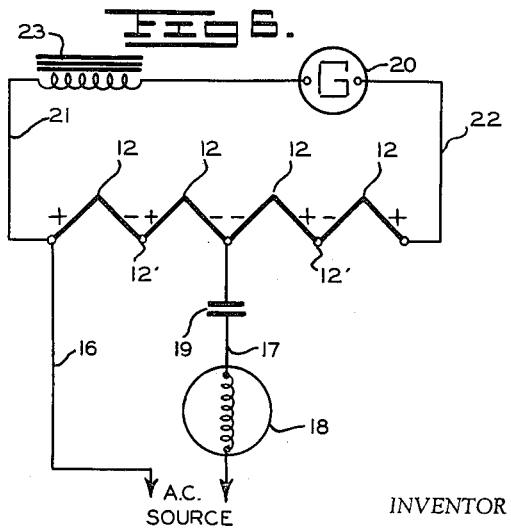

2,745,283

TEMPERATURE CHANGE COMPENSATED THERMAL MEASURING DEVICE

Charles E. Hastings, Hampton, Va., assignor to Hastings Instrument Company, Inc., Hampton, Va., a corporation of Virginia Application January 23, 1950, Serial No. 140,140

5 Claims. (Cl. 73—204)

This invention relates to thermal compensation circuits for use, for example, with thermal anemometers which depend for their operation on the cooling effect of an airstream whose velocity is to be measured on a heated thermopile disposed therein, as generally disclosed in my prior application Serial No. 587,000, filed April 6, 1945, now Patent 2,540,822. Particularly, the invention relates to novel features of improvement adapted to compensate the transient effect of ambient temperature changes on thermal anemometers and other devices.

It is an object of the present invention to provide in circuits transiently affected by ambient temperature change a compensating thermopile adapted to oppose and exactly compensate the transient temperature effect in the circuits.

It is a further object of the invention to provide means for compensating thermopile anemometers and similar instruments for transient errors due to ambient temperature changes.

Another object is to provide a thermopile anemometer insensitive to ambient temperature change.

Still another object is to provide novel thermopile structure wherein alternate thermopile junctions are mounted in heavy copper studs, to constitute rigidly supported cold junctions.

Further objects will be in part obvious and in part pointed out hereinafter.

The invention and the novel features thereof may best be made clear from the following description and the accompanying drawings, in which:

Figure 1 is a sectional view illustrating an uncompensated thermopile anemometer constructed according to the present invention, and the heating and measuring circuits employed therewith;

Figure 2 is a sectional view of another form of thermopile anemometer, employing simplified heating and measuring circuits;

Figure 3 is a perspective view of an anemometer probe tip, comprising a thermopile corresponding generally to that of Figure 2 and including a compensating thermopile which constitutes an outstanding feature of the present invention;

Figure 4 is a schematic circuit diagram of the device of Figure 3;

Figure 5 is a schematic circuit diagram corresponding generally to Figures 3 and 4, but illustrating alternative compensating thermopile structure, and Figure 6 is a schematic circuit diagram illustrating one manner of compensating the thermopile anemometer of Figure 1 to cancel transient effects of ambient temperature changes.

According to the present invention, a linear thermopile may be made up of alternate lengths of thermocouple material forming two or more thermocouple sections, joined end-to-end to obtain a continuous wire. Alternate junctions of the thermopile are suitably mounted in relatively massive support members of high heat conductivity, such as copper studs, which provide sufficient heat conductivity away from the junctions so mounted to keep them at ambient temperature. Accordingly, on heating the thermopile, as by the passage of alternating current therethrough, the junctions mounted in copper studs remain at substantially ambient temperature and become cold junctions, while the alternate junctions not so mounted are heated by the current and become hot junctions. In this manner a direct current voltage is generated by the thermopile, which is proportional to the temperature difference between alternate junctions.

The thermopile so described may be disposed in a moving fluid stream, which will exert a cooling effect on the hot junctions of the thermopile and in this manner reduce the temperature difference between alternate junctions. A galvanometer may be employed to measure the voltage generated by the thermopile, the magnitude of which will be inversely indicative of the cooling effect of the fluid stream, and thereby of the fluid stream velocity.

The heated thermopile may thus be variously employed to measure the velocity of moving fluid streams, and is sensitive and accurate over a wide range of velocities. The device may be employed, for example, to measure air movement of the order of a few feet per minute, such as may be encountered in the convection current of a heating unit, and may be employed with equal utility to measure fluid velocity in ducts, as a meteorological instrument, and as an air-speed indicator in helicopters, propeller-driven and jet aircraft.

In Figure 1 is shown a thermopile constructed of alternate sections of thermocouple materials 10 and 11, the alternate sections being butt welded or similarly joined end-to-end into junctions 12. Alternate junctions 12' are suitably mounted in relatively massive heat conducting supporting members, such as copper studs 13, the studs serving not only to effect cold junctions, but also to support the relatively fragile thermopile. In the embodiment shown, the thermopile may be inserted into drilled holes 14 of the studs, and the studs then clamped into electrical and heat conducting contact with the junctions thereof. Obviously, the thermopile may be attached to the studs in any equivalent fashion, such as by insertion into slots, by means of clips, welding or the like. The studs 13 are suitably spaced and supported by an insulating block 15.

The thermopile illustrated in Figure 1 comprises two complete thermocouples, whereby the thermopile will generate a voltage equal to the summation of the voltages induced by the individual thermocouples. For the purposes of the invention, the thermopile may comprise any desired number of thermocouple sections, depending primarily on the voltage required for measurement or similar purpose, and the term "thermopile" is used in the present specification and claims as inclusive of a single thermocouple and any greater number of thermocouples. The thermocouple materials 10 and 11 may be gold and platinum, or may constitute any other thermocouple material pairs, such as constantan-chromel, copper-constantan, chromel-alumel, and platinum-platinum, rhodium.

Provision is made for heating the thermopile of Figure 1 by a suitable alternating current conducted to the end studs 13' supporting the ends of the thermopile. The alternating heating current may be of any desired frequency, eight hundred cycles per second, for example, being entirely satisfactory. It will be apparent that in aircraft applications, alternating current may be supplied by a suitable inverter. As shown, the heating current is conducted to end studs 13', and therethrough to the ends of the thermopile, through a heating circuit comprising conductors 16 and 17, the heating circuit including also a ballast tube 18 and condenser 19 therein, for reasons presently apparent. A suitable voltage responsive device such as galvanometer 20, preferably a millivoltmeter, is connected across the thermopile by means of conductors 21 and 22, the galvanometer circuit including a choke 23 in series therewith. By means of the heating circuit, power is fed through the thermopile, and the thermopile accordingly heated. Heat generated in the alternate junctions 12' will be dissipated through the copper studs 13, whereby they will remain at substantially ambient temperature. Alternate junctions 12, however, will be heated, and a direct current voltage will be generated by the thermopile by reason of the temperature difference between alternate junctions thereof.

The circuits shown are designed to permit a direct measurement of the direct voltage by means of galvanometer 20, the condenser 19 in the heating circuit being effective to prevent passage of direct current therethrough while permitting the passage of alternating current, and the choke 23 in the galvanometer circuit functioning to suppress alternating current, but permitting passage therethrough of the thermopile direct voltage. Ballast tube 18 insures a constant current in the heating circuit. In this manner, a true indication of the thermopile induced voltage may be obtained on galvanometer 20.

If the heated thermopile be disposed in a moving fluid stream, it will be evident that hot junctions 12 thereof will be cooled by the fluid passing thereover, and the temperature difference between the hot and cold junctions of the thermopile will be correspondingly reduced. The resultant reduction in induced thermal voltage of the thermopile will be proportional to the velocity of the fluid stream, so that by proper calibration the galvanometer 20 may directly indicate the velocity of the fluid surrounding the thermopile.

A more practical method of supplying alternating current heating power to a thermopile is illustrated in Figure 2, wherein the exemplary thermopile comprises four thermocouples arranged in two branches of opposite polarity relative to the center junction 12'' thereof. In this modification, alternating current is supplied to the transformer 24, and thence through conductors 25 and 26 to the end studs 13'. The secondary coil of the transformer is center-tapped, and connected by means of conductor 27 through galvanometer 20 to the center stud 13'' upon which is mounted the center junction 12'' of the thermopile.

In this arrangement, the thermal voltages generated by the individual thermocouples of the thermopile are such that the two branches thereof are effectively in parallel supplying the galvanometer. Since the galvanometer is connected between the center tap of the power supply and the center junction of the thermopile, the alternating current voltages therethrough will cancel, the center taps being at points of equipotential, and little or no alternating current will flow through the galvanometer. As in the preceding case, the direct current voltage generated by the thermopile is proportional to the temperature difference between the hot and cold junctions thereof and may, as in the former case, be observed directly on the galvanometer as indicative of the velocity of the fluid stream in which the thermopile is disposed.

By a proper choice of thermocouple materials, the thermopile type anemometer may be made reasonably independent of ambient temperature, over a considerable range. However, when a change of ambient temperature occurs, a transient thermal voltage is produced which causes an erroneous galvanometer indication. The error is produced because the cold junctions have a greater thermal inertia than do the hot junctions. In the preferred thermopile construction of the present invention, it will be recognized, the thermal inertia of the stud-mounted cold junctions is very much greater than that of the hot junctions. Thus, when a change of ambient temperature occurs, the absolute temperatures of both hot and cold junctions will be affected, but the cold junctions will respond thereto much more slowly than the hot. Hence, a transient thermal voltage is produced which will decrease exponentially with time so long as the new ambient temperature remains constant. The magnitude of the transient error will depend upon the rate and magnitude of the ambient temperature change.

The transient response of a thermocouple to a change in temperature may be expressed as follows. A thermocouple junction maintained at one temperature and suddenly exposed to another, will approach the new temperature exponentially, as may be expressed by the equation $$T = T_2 + (T_1 - T_2) e^{-\alpha t}$$

where $T$ is the actual temperature of the thermocouple junction, $T_1$ is the initial temperature ($t=0$), $T_2$ is final temperature ($t=\infty$), $\alpha$ is a thermal time constant and $t$ is the time variable. For a thermocouple having a junction with a thermal time constant $\alpha_1$, and another junction with a time constant $\alpha_2$, the difference in their temperature when the ambient temperature is suddenly changed is $$\Delta T = (T_1 - T_2)(e^{-\alpha_1 t} - e^{-\alpha_2 t})$$

This is a curve which begins at zero, reaches a maximum, then approaches the zero axis asymptotically as $t$ increases.

The error due to ambient temperature change may be a serious defect in thermopile anemometers, particularly when employed under conditions of rapidly changing or fluctuating temperature. To compensate for this error, as an outstanding feature of the present invention, an additional thermopile is provided in series with the galvanometer employed to measure the direct current thermal voltage. The compensating thermopile is desirably constructed in a manner essentially similar to that of the heated thermopile, but is not heated, and the compensating thermopile is exposed to the fluid stream whose velocity is being measured. By a proper choice of size and construction of the compensating thermopile, and by proper insertion in the galvanometer circuit, the transient effects of temperature change may be made to cancel entirely. The compensating thermopile is always arranged to be opposed in polarity to the heated thermopile.

An exemplary embodiment of the compensating principle is illustrated in Figure 3, wherein is shown an anemometer probe tip 28, with studs 13 extending therefrom and supporting a thermopile composed, in this example, of two thermocouples arranged in branches of opposed polarity, in the manner of the thermopile of Figure 2. As in that example, the thermopile is heated by alternating current supplied by transformer 24 through conductors 25 and 26 to end studs 13', the center tap of the transformer being connected by conductor 27 through galvanometer 20 to the center junction 12'' of the thermopile. In the compensated embodiment, however, conductor 27 is not connected directly to center stud 13'', but is connected to an added stud 13''', from which a compensating thermopile comprising, in this case, a single thermocouple extends to the center junction of the heated thermopile.

The device of Figure 3 is schematically illustrated in Figure 4, wherein the polarity of the branches of the heated thermopile and of the compensating thermopile is suitably indicated by plus and minus signs. The polarity of the compensating thermopile, it will be noted, is opposed to that of the branches of the heated thermopile. It will be readily recognized that the compensating thermopile carries no heating current. If constructed of the same materials and exactly similar to the branches of the heated thermopile, similarly exposed to the fluid stream, and disposed with polarity as indicated, transient errors due to ambient temperature change will be exactly compensated. That is, the compensating thermopile can be made to have exactly the same transient response as the heated thermopile, and any transient direct current voltage induced in the branches of the heated thermopile by changes in ambient temperature will be opposed and cancelled by an identical voltage induced in the compensating thermopile, and of opposite direction.

Another mode of applying the compensating principle to the device of Figure 3 is illustrated schematically in Figure 5, wherein the heating current is applied directly to the two-thermocouple thermopile, and two compensating thermocouples are provided, one connected to each end of the heated thermopile and opposed in polarity to the adjacent branch thereof. The two compensating thermocouples in this case constitute the compensating thermopile. The galvanometer 20 is in circuit with the center junction of the heated thermopile through conductor 29, and with each of the compensating thermocouples through the parallel conductor branches 29', each of which includes a high resistance 30. The compensating thermocouples, it will be recognized, remain virtually unheated by the alternating current, the passage of which therethrough is limited by the resistances 30. The unheated compensating thermocouples being in series with and of opposite polarity to the heated thermopile in the galvanometer circuit, they effectively compensate for transient error due to ambient temperature change in the same manner as in the alternative embodiment previously described.

Adaptation of the compensating feature to a linear thermopile of the type disclosed in Figure 1 is illustrated in Figure 6, which is a schematic circuit diagram corresponding exactly to the device of Figure 1, except for the addition of a two-thermocouple thermopile to the galvanometer circuit. As shown, the compensating thermopile is in series with the galvanometer, and opposed in polarity to the heated thermopile. It will be evident from the description of the galvanometer circuit of Figure 1 that the compensating thermopile inserted thereinto will remain unheated, but if exposed with the heated thermopile to a moving fluid stream will be effective to automatically, fully and exactly compensate at all times for transient voltage effects due to changes in ambient temperature.

The thermopiles exposed to the fluid stream may be in any convenient form, such as straight, curved or spiral. If desired, the thermopiles may be disposed in the form of circles, to obtain an anemometer non-directional in two dimensions.

It will thus be seen that there has been provided by this invention a structure in which the various objects hereinbefore set forth, together with many practical advantages, are successfully achieved. As various possible embodiments may be made of the mechanical features of the above invention, all without departing from the scope thereof, it is to be understood that all matter hereinbefore set forth or shown in the accompanying drawings is to be interpreted as illustrative, and not in a limiting sense.

I claim:

1. A heat transfer measuring device comprising, a main thermopile having at least one thermocouple section, a compensating thermopile having at least one thermocouple section, each thermocouple section of both thermopiles having junctions of a first class which have low and substantially identical thermal inertia, and the sections of both thermopiles having alternate junctions of a second class which have high and substantially identical thermal inertia so as to remain at ambient temperature, means mounting both thermopiles so that all the first class junctions of both thermopiles are similarly exposed solely to a surrounding fluid medium, the heat transfer between which and the first class junctions is to be measured, and so that all the second class junctions of both thermopiles are similarly exposed to their surroundings, a circuit including a voltage responsive means, means tending to maintain the temperature of the first class junctions of only the main thermopile at a level differing from the temperature of said surrounding fluid medium, the main and compensating thermopiles being connected into said circuit in voltage opposition with respect to each other so that said voltage responsive means responds to the difference between the voltages produced by said thermopiles, the arrangement being such that the transient voltages generated at the main thermopile during periods of change in ambient temperature will be compensated by transient voltages generated in the compensating thermopile during said periods of change in ambient temperature.

2. A device as in claim 1 wherein the means tending to maintain the temperature of the first class junctions of only the main thermopile includes means limiting the flow of a heating current to be through the main thermopile only.

3. A circuit as in claim 2 wherein the circuit includes a mid-tapped alternating current source, the main thermopile having two thermocouple sections with a junction therebetween connected in voltage opposition across the alternating current source, the compensating thermopile and voltage responsive means being connected in series between the mid-tap of the alternating current source and the junction between said two thermocouple sections of the main thermopile, the compensating thermopile being so connected that its voltage subtracts from the voltage generated by the thermocouple sections of the main thermopile in relation to the responsive means, the arrangement being such that the main thermopile is heated by the alternating current but the compensating thermopile is not heated thereby.

4. A circuit as in claim 2 wherein the main thermopile comprises two thermocouple sections connected in voltage opposition across an alternating current source and wherein the compensating thermopile comprises a first thermocouple section connected at one end of the main thermopile and a second thermocouple section connected to the other end of the main thermopile, a high direct current passing impedance connected between the remaining ends of the thermocouple sections of the compensating thermopile and means for connecting the voltage responsive means between a mid point of the high impedance and the mid junction of the main thermopile, the thermocouple sections of the compensating thermopile being connected in voltage opposition to the main thermopile relative to the voltage responsive means, the arrangement being such that the main thermopile is heated by the alternating current but the compensating thermopile is not heated thereby.

5. A circuit as in claim 2 wherein the main thermopile is connected across a source of alternating current and wherein the compensating thermopile is connected in series with the main thermopile but in voltage opposition thereto in a series circuit including said voltage responsive means and including a direct current passing but alternating current blocking impedance, the arrangement being such that the main thermopile is heated by the alternating current but the compensating thermopile is not heated thereby.

(References on following page)

References Cited in the file of this patent

UNITED STATES PATENTS

| | | |
|---|---|---|
| 764,175 | Bristol | July 5, 1904 |
| 1,103,640 | Wilson | July 14, 1914 |
| 1,456,591 | Goodwin | May 29, 1923 |
| 1,505,497 | Roller | Aug. 19, 1924 |
| 2,225,941 | Hall | Dec. 24, 1940 |
| 2,377,516 | Ray | June 5, 1945 |
| 2,434,433 | Ray | Jan. 13, 1948 |
| 2,446,283 | Hulsberg | Aug. 3, 1948 |

FOREIGN PATENTS

| | | |
|---|---|---|
| 7,597 | Great Britain | 1914 |
| 44,482 | France | Nov. 8, 1934 |
| 802,705 | France | June 13, 1936 |

OTHER REFERENCES

Vacuum Thermocouples for Measuring Weak Alternating Currents, P. J. Kipp and Zonen, pub. in Instruments, Aug. 1931, p. 472.

A New Type Instrument for Measuring Air Velocity, C. E. Hastings, Dec. 1948, American Institute of Electrical Engineers winter general meeting, New York, N. Y., Jan. 31–Feb. 4, 1949.